Jan. 6, 1942.  J. R. ALLAN ET AL  2,268,918
ROCKING ELECTRIC FURNACE VENTILATING SYSTEM
Filed Aug. 30, 1939   3 Sheets-Sheet 1

JAMES R. ALLAN
FRANK H. AMOS
INVENTORS
by Arthur J. Robert
ATTORNEY

Jan. 6, 1942.  J. R. ALLAN ET AL  2,268,918
ROCKING ELECTRIC FURNACE VENTILATING SYSTEM
Filed Aug. 30, 1939    3 Sheets-Sheet 2
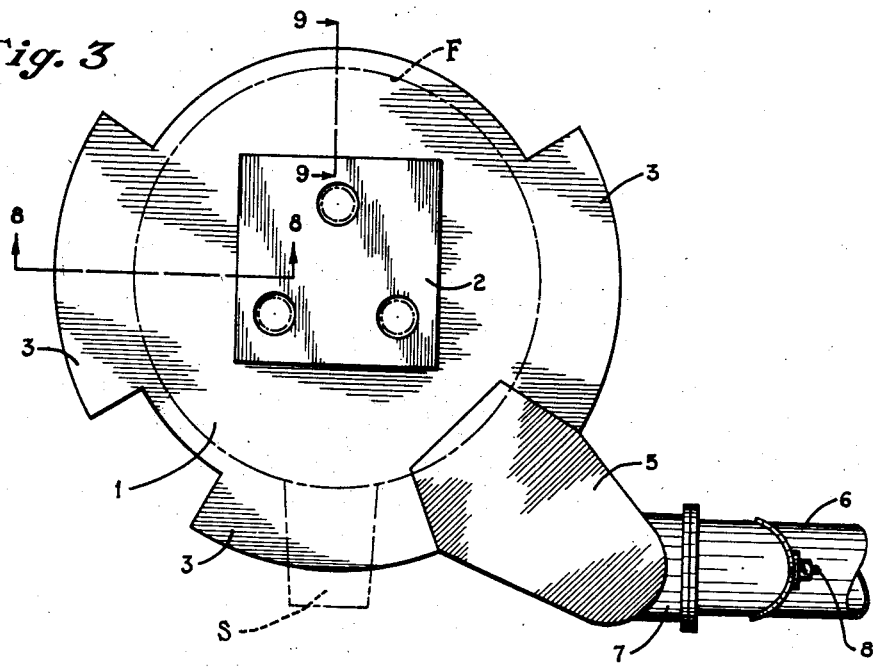
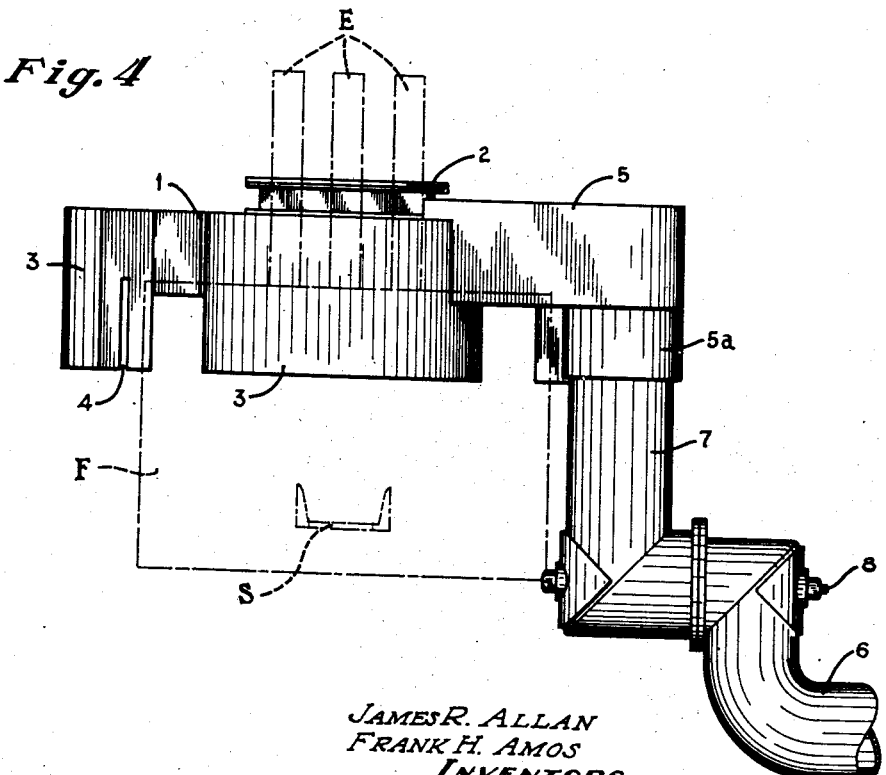
JAMES R. ALLAN
FRANK H. AMOS
INVENTORS
by Arthur J. Robert
ATTORNEY Jan. 6, 1942.  J. R. ALLAN ET AL  2,268,918
ROCKING ELECTRIC FURNACE VENTILATING SYSTEM
Filed Aug. 30, 1939  3 Sheets-Sheet 3
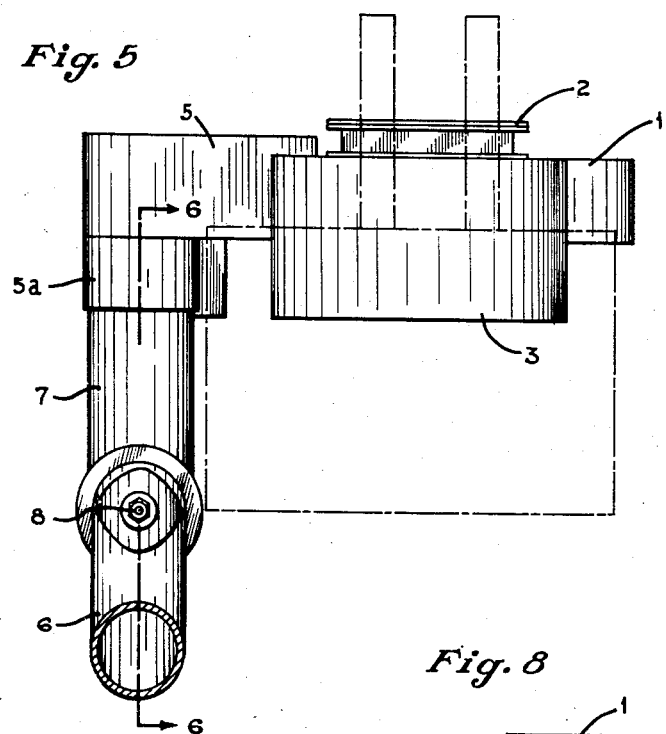
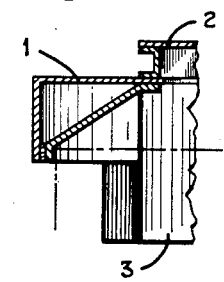
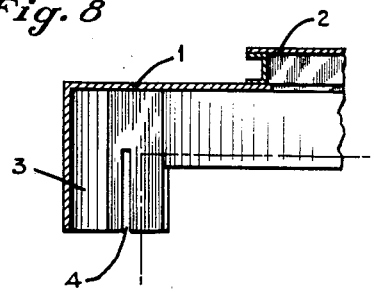
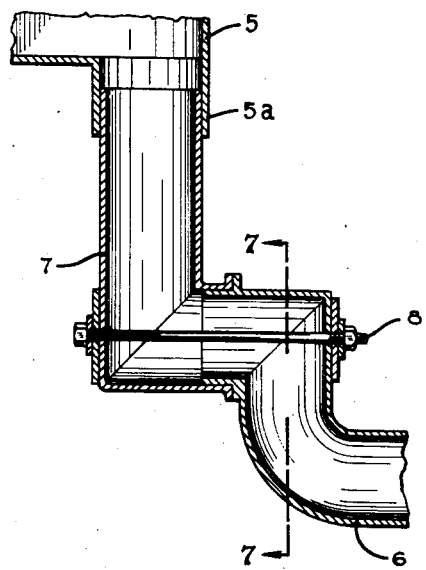
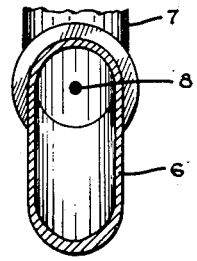
JAMES R. ALLAN
FRANK H. AMOS
INVENTORS
by Arthur J. Robert
ATTORNEY Patented Jan. 6, 1942

2,268,918

UNITED STATES PATENT OFFICE 2,268,918

ROCKING ELECTRIC FURNACE VENTILATING SYSTEM

James R. Allan, Oak Park, and Frank H. Amos, Fox Lake, Ill., assignors to American Air Filter Company, Inc., Louisville, Ky., a corporation of Delaware Application August 30, 1939, Serial No. 292,694

1 Claim. (Cl. 266—15)

This invention relates to improvements in ventilating systems for electric melting furnaces. While the invention is applicable to rocking electric melting furnaces generally, it is particularly suited for application to, and hereinafter explained in connection with, an electric furnace of the type which is rocked or tilted about a fixed axis during the pouring operation.

Heretofore, tilting furnaces in metallurgical foundries and the like have been ventilated, to remove the fumes, gases and dust escaping from them during operation, by the use of large propeller-type fans usually located in the roof of the foundry or other building which houses the furnace. With this type of installation, it is ordinarily necessary to move from 75,000 to 250,000 C. F. M. of air from the building in order to produce a moderately effective ventilating draft around the furnace. Even then, the ventilating results are not very satisfactory, while the removal of such enormous quantities of air necessarily brings about high-heating costs during cold weather. Nevertheless, this method has been extensively used because of the difficulty of effectively housing and continuously ventilating the furnace without, at the same time, interfering with the loading, pouring and other operations of the furnace.

The principal object of the present invention is to provide a simple exhaust hood for effectively housing and continuously ventilating the furnace without interfering with its operation.

Another important object is to render furnace ventilation efficient and effective while reducing the flow of ventilating air to a fraction of that heretofore required.

The invention is illustrated in the accompanying drawings, wherein:

Fig. 3 is a top plan view of the arrangement shown in Fig. 1 with the embodiment in solid lines and the furnace in dotted lines, a portion of the furnace parts being omitted for the sake of clearness;

Figure 4 is a front elevation of the structure shown in Figure 3;

Figure 5 is a side elevation taken from the right of Figure 4;

Figure 6 is a section taken along line 6—6 of Figure 5;

Figure 7 is a section taken along line 7—7 of Figure 6; and

Figure 1:
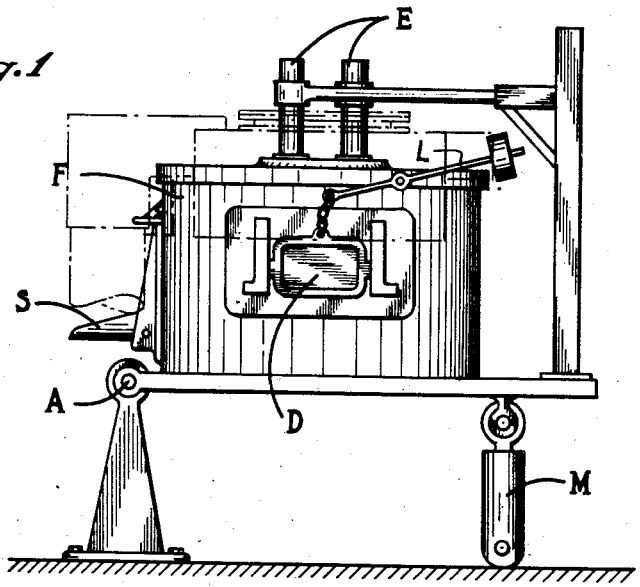
Figs. 1 and 2 are side elevations of an embodiment of the invention as applied to a conventional electric melting furnace in normal and tilted positions respectively, the furnace being shown in solid lines and the embodiment in dotted lines.
Figure 2:
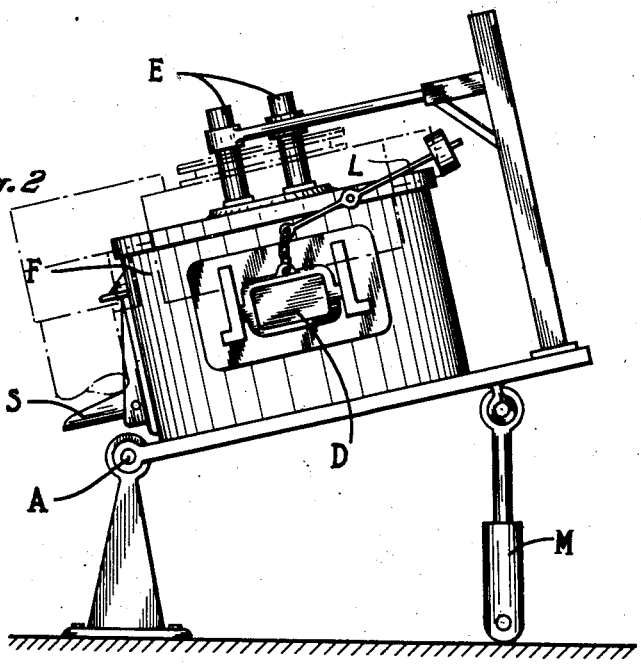

Figures 8 and 9 are sections taken along lines 8—8 and 9—9, respectively, of Figure 3.

The invention is illustrated as applied to a conventional electric furnace F having circular bottom and top walls separated by a cylindrical member providing the side walls. The cylinder is provided, at opposite sides, with diametrically opposed charging doors D and, at its front, with a pouring spout S while the top wall contains suitable openings to receive the electrodes E.

Generally stated, the invention consists in mounting, on the top of the furnace for movement with it, an exhaust hood, having a suction canopy or awning over each door and spout, and connecting the hood to an exhaust system through a flexible connection which accommodates the tilting movement of the furnace without interrupting the flow of ventilating air. Accordingly, an exhaust hood 1, composed of sheet metal in the form of a wide shallow cup, is inverted over and mounted upon the top of the furnace F to provide a top air chamber thereover. The top of the hood 1 is provided with openings through which the electrodes E pass. The annular clearance space between each electrode and the periphery of the opening through which it passes provides an inlet through which outside air may be drawn along the electrode into the hood to prevent the escape of furnace fumes and gases from that area of the hood. These openings preferably are formed in a plate 2 composed of a suitable non-magnetic material such as nickel-chromium alloy. The plate may be welded or otherwise secured to the hood 1.

The sides of the hood 1 are cut away to form openings directly over the doors D and spout S. At these openings, the hood is outwardly extended by suction canopies 3 which depend downwardly approximately to the level of the upper end of the door and spout openings. These canopies, which form air passageways leading from the door and spout areas into the top air chamber, are dimensioned to accommodate such flow of air as may be required to carry off the gas fumes and dust escaping through the furnace openings. By extending each canopy downwardly to the upper level of the furnace "charge" openings, i. e. charging and discharging openings it is made effective to remove the escaping material without, at the same time, interfering in any way with the loading, pouring, and other operations of the furnace. Each door canopy preferably is provided with a slot 4 to accommodate the furnace-door operating levers L.

The hood also is provided with an outlet manifold 5 preferably located between the spout canopy and one of the door canopies. The manifold 5 is connected to the stationary duct 6 of an exhaust system through a flexible form of connection capable of accommodating the tilting movement of the furnace without interrupting the flow of air. While this may be accomplished in various ways, as through the use of a flexible pipe, it preferably is accomplished by aligning the furnace end of the duct 6 axially with the tilting axis A of the furnace and connecting the manifold 5 directly to the duct 6 through an interposed elbow 7 which is rotatably mounted in the duct 6. The duct 6 and elbow 7 may be rotatably held together in any suitable manner as by the axial bolt 8. With this form of connection, the elbow 7 swings about the same center as the furnace, when the latter is moved between its normal and tilted positions, and thus maintains open communication between the hood and the exhaust system at all times. In many installations, it is not possible to place the duct 6 in axial alignment with the axis A due to the location of building supports or other fixed abutments. Consequently, to compensate for any deviation in the alignment of the joint axis with the tilting axis A, the upper end of the elbow 7 may be telescopically fitted to the depending sleeve 5a of the outlet manifold 5.

With a system of this character, it is only necessary to move approximately 4,000 C. F. M. of air per ton of furnace capacity. With a flow of this magnitude and with air-inlet openings designed to accommodate such flow at a velocity of approximately 500 lineal feet per minute, substantially all of the gases, fumes and dust, escaping the furnace openings, will be drawn directly into the exhaust hood and thus effectively prevented from drifting into the atmosphere of the building in which the furnace is housed. The exhaust hood does not interfere with the charging or pouring operations and, as will be evident, is of a simple design which is relatively inexpensive to manufacture and install, as well as not troublesome to operate or maintain in operation.

It will be apparent that this system may be used to ventilate electric furnaces which are mounted on a rocker for rocking or tilting movement between normal and pouring positions. This type of furnace does not, of course, have a fixed axis, corresponding to axis A, with which the duct 6 can be aligned. The same type of connection between duct and hood, as previously described, can, however, be readily used, particularly when the duct is located adjacent the contact area about which the furnace rocks, i. e., the area along which the rocker engages the base member during the rocking movement. In such installations, the duct preferably is located below the level of the contact area.

Having described our invention, we claim:

A ventilating system for an electric melting furnace, having a spout opening, one or more other "charge" openings, through which furnace gases and dust escape to the outer atmosphere during operation, and a fixed furnace tilting axis below the level of said spout opening but more or less adjacent thereto, comprising: an exhaust hood extending over the top of the furnace and mounted thereon for movement therewith; said hood having a suction canopy—extending over and in open communication with the outer atmosphere adjacent the spout opening and each of the other charge openings to draw the escaping gases and dust into said hood—and an outlet manifold terminating in a depending sleeve; an exhaust system having a duct terminating near the furnace in substantially axial alignment with said fixed axis; and an elbow-pipe connection between said depending sleeve and duct, said pipe connection being telescopically fitted to the sleeve and rotatably mounted on the duct.

JAMES R. ALLAN.
FRANK H. AMOS.